Figure 1:
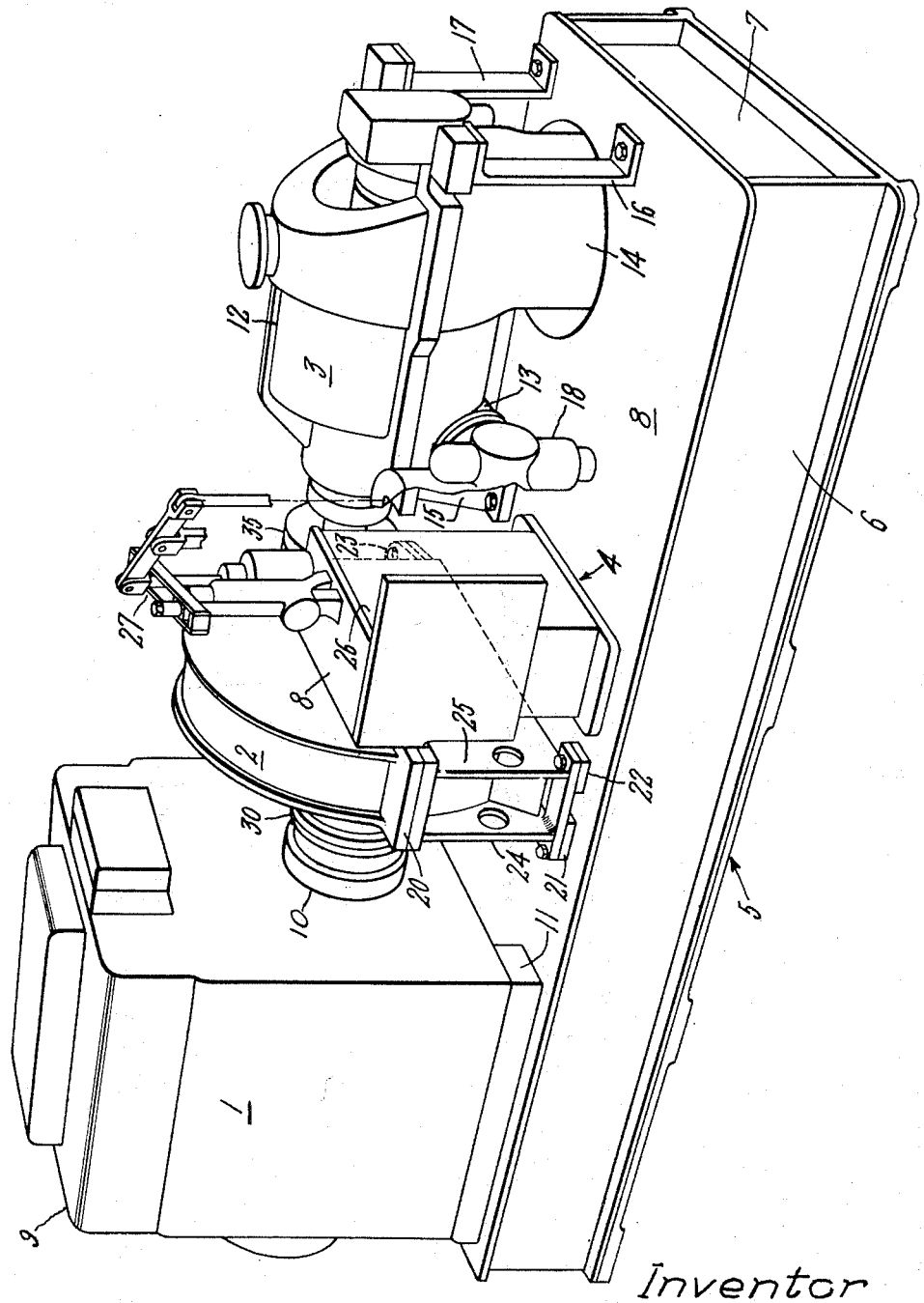

May 25, 1965    H. N. HOFFMAN    3,185,854
TURBINE-GENERATOR

Filed Aug. 14, 1964    2 Sheets-Sheet 1

Inventor
Herbert N. Hoffman
by W.C. Cutcher
His Attorney

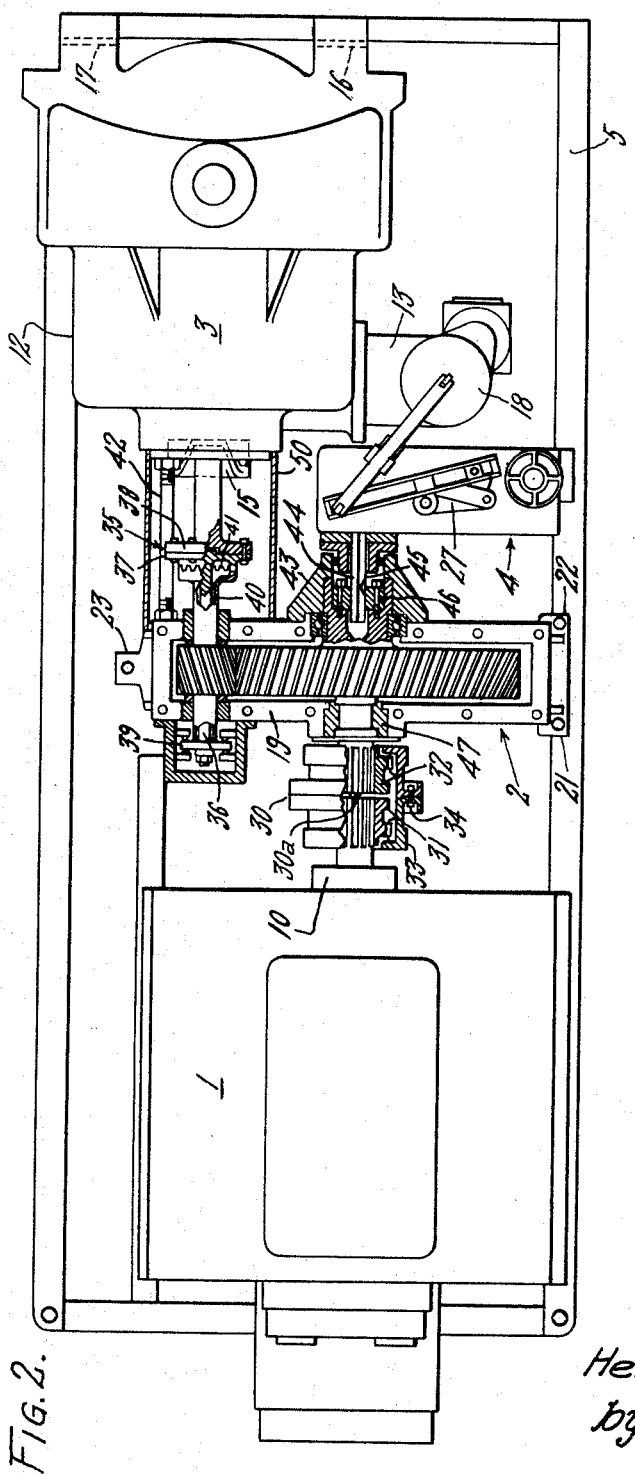

3,185,854
TURBINE-GENERATOR
Herbert N. Hoffman, Lunenburg, Mass., assignor to General Electric Company, a corporation of New York
Filed Aug. 14, 1964, Ser. No. 389,746
8 Claims. (Cl. 290—52)

*Abstract*: Turbine, reduction gears, generator and control console are separate units each having sufficient rigidity in its own casing to maintain internal alignment. Shaft connections are through flexible couplings. Reduction gear is on axially flexible mounting and contains single locating thrust bearing for coupled high speed gear and turbine shafts.

This invention relates to an improved arrangement for a turbine-generator set which is disposed on a supporting base structure subject to temperature changes and erratic deflecting forces. More particularly, the invention relates to a new concept in marine turbine-generator sets with regard to improved alignment features.

Initial alignment of large rotating machinery is a major factor in the cost of installation. Continued alignment or control of unavoidable misalignment during operation is a major factor in reducing wear and maintenance on such machinery. Alignment may be related to internal alignment of a single unit, i.e., maintenance of dimensional relationships between the rotating parts or between the rotating and stationary parts of a single unit despite local deflections of the outer casing of the unit. Conversely, alignment may be related to more than one piece of rotating equipment and concerns the coupling of the rotating members between units so that the axis of rotation is maintained in a straight line.

Prior concepts of alignment in a turbine-generator set were concerned initially with obtaining a base structure which was as rigid as possible. An example of this design philosophy is seen by reference to U.S. Patent 2,531,178 issued to F. H. Van Nest wherein a steam turbine condenser provided torsional rigidity of the supporting base structure for the turbine, generator, and reduction gear. The method of initial alignment usually consisted in removing the upper halves of the casings and making adjustments until the shafts were aligned. Rigid couplings, such as bolted flanges, were employed with the idea that the rigid base structure would then maintain the shafts in alignment.

When bracing the supporting base structure against local deflection is difficult, another approach is to arrange to have the casings move relative to one another in a controlled and predictable manner. An example of this approach is seen in U.S. Patent 2,412,848 issued to G. B. Warren, wherein a direct coupled gas turbine and generator had their respective casings connected by ball-and-socket type joint.

It is known that flexible couplings may be used to connect the shafts of two pieces of rotating equipment so that torque will contiue to be transmitted, even though the axes may become slightly skewed or offset. Flexible couplings fall into several categories. One species of flexible coupling is both torsionally and laterally flexible but axially rigid so as to maintain an exact axial relationship between shafts and to transmit thrust, as in the case of a slender shaft portion. Another species is laterally flexible, axially slidable, but torsionally rigid, as in the case of a spline tooth coupling. One type of this same species is made with axial stops within the coupling to limit the axial movement (float) of one shaft member relative to the other, thus providing a coupling arrangement suitable for transmitting light axial thrust forces between coupled shafts where a slight amount of relative axial movement between connected shafts is permissible.

It has been known to use a thrust-transmitting flexible coupling to connect the turbine shaft with the reduction gear pinion, and to design the machine so that axial thrust caused by a single helical gear pinion opposes thrust caused by reaction in the steam turbine stages. A thrust bearing is employed in this case to fix the axial positions of the shafts and to carry the unbalanced thrust. However, at locations removed from the thrust bearing, thermal changes affect the rotation and stationary parts differently, so as to cause changes in axial clearance, such as the vital steam nozzle clearances. The use of a thrust-transmitting flexible coupling for connecting the high-speed pinion of the reduction gear to the turbine in a marine turbine-generator may be seen in U.S. Patent 2,867,999 issued to H. N. Hoffman and S. P. Brickett. Under the older concepts of shipboard generator sets, the deflection forces of the supporting base structure must be resisted by or absorbed within the various casings of the generator, reduction gear, and turbine with resulting casing deflections and misalignment of internal parts.

Under the older concepts of attempting to maintain rigid casings and supporting structures, initial alignment procedures are time-consuming and costly. Despite various techniques for simplifying alignments, as exemplified in U.S. Patent 2,821,094 issued to F. R. Ericson, it was usually necessary to remove portions of the casing to expose the shaft and bearings. Opening the casings after installation causes duplication of effort, since the units are usually carefully aligned on the supporting base structure prior to leaving the factory.

When compactness, simplicity, and high efficiency of a turbine-generator set are desired, such as in a generating set for shipboard use, an arrangment having a single locating thrust bearing for the turbine/high speed gear rotor and one for the low speed gear/generator rotor has many advantages. Further advantage from the standpoint of lubrication and servicing is gained by locating these thrust bearings within the gear casing. With a single thrust bearing serving a single complete rotor assembly, it is necessary to couple the components comprising the rotor assembly together with a type of coupling that will transmit the necessary power, will withstand the shaft misalignment associated with the application and will maintain the required axial relationship between the components of the rotor assembly and withstand the axial thrust that the components of the rotor assembly transmit across it. Also, when a thrust bearing serves a complete rotor span, the casings housing the various components of the rotor span must be located relatively to each other either by attaching to a base structure or together to maintain the required relationship of parts. When close clearances of rotating parts are involved and transient temperature differences are involved, such as in a steam turbine driving a high speed gear rotor and utilizing a single thrust bearing located within the gear casing to locate the complete rotor assembly, it may be necessary, in addition to connecting the components of the rotor assembly with a type of coupling that will maintain exact relationship between the components of the rotor assembly, to also connect the casing surrounding these components together to maintain close axial relationship. This usually involves fixing one casing or one end of a casing to a base or foundation so that it becomes the anchor point for a group of casings, and fastening the casings housing the components of a rotor assembly together so that they maintain the required axial relationship. In an arrangement where casings are connected together and also to another member such as a base structure, some provisions such as sliding surfaces or directional flexibility of supporting structural members between the casings and the base are necessary to permit the ties between the casings to locate them axially with low levels of resistive forces from the base.

Accordingly, one object of the present invention is to provide an improved arrangement of a turbine-generator set with reduction gear which reduces and simplifies initial alignment of rotors during installation.

Another object of the invention is to provide an improved turbine-generator set arrangement for disposition on a base supporting structure subject to local erratic deflecting forces, such as in a marine turbine-generator set.

Another object of the invention is to provide a turbine-generator arrangement in which axial clearances in the turbine are maintained by a single locating thrust bearing in the reduction gear despite transient temperature conditions.

Still another object of the invention is to provide an improved arrangement for a turbine-generator set with separate reduction gear and control console, wherein misalignments of the base are not transferred so as to distort individual pieces of equipment and their interior parts.

Another object of the invention is to provide an improved turbine-generator set capable of withstanding greater foundation distortions, and also permitting simplified alignment checks without opening the casings.

Briefly stated, the invention is practiced by providing several separate units, such as steam turbine, reduction gear, generator, control console each having sufficient rigidity in its own casing to maintain the required alignment of its internal parts. The units are connected by suitably selected flexible couplings. The reduction gear is disposed on an axially flexible mounting and contains a single locating thrust bearing for the high speed shaft assembly.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a perspective view of the turbine-generator set with reduction gear and control console, shown mounted on a typical base structure, and FIG. 2 is a plan view, taken in section along the horizontal joint of the reduction gear, showing details of the flexible couplings.

Referring now to FIG. 1 of the drawing, the primary components are a generator 1, reduction gear 2, steam turbine 3, and control console 4, mounted on a supporting base structure 5.

The base 5 is made up of longitudinal side beams 6, transverse cross beams 7, and other internal cross-beam and bracing members which are obscured by the top plate 8.

The electric generator 1 has a casing 9 which is constructed to be very rigid so as to support the rotor (not shown) between two bearings supported in the opposed end walls, such as 10. Casing 9 is mounted on base 5 by means of rigid feet 11.

The steam turbine 3 has a casing 12 with a high-pressure inlet 13 and an exhaust 14. Again, the casing is of rigid two-piece construction with no vertical joints, so as to support the rotor (not shown) between two bearings at opposite ends of casing 12 with minimum internal misalignment. To further reduce the possibility of distortions in the base 5 from being communicated to the turbine casing 12, casing 12 is supported on a 3-point support comprising a single rigid pedestal 15 on the high-pressure end and dual relatively flexible pedestals 16, 17 on the low-pressure end. Attached to the inlet 13 of the turbine is the control valve chest 18.

The reduction gear 2 includes a circular gearing casing 19 with a heavy horizontal flange 20 supporting the high-speed gear rotor bearings and the low-speed gear rotor bearings (not shown). The rigidity of the heavy flange 20 carrying the bearings makes the structure sufficiently rigid to maintian accurate gear tooth alignment between the high speed and low speed rotors. In order to prevent communicating local distortions from base 5 into gear casing 19, the gear casing is supported on three points, similar to the turbine 3, as indicated by dual support pads 21, 22 on one side of the gear casing and a single support pad 23 on the other side. Pads 21, 22, 23 are relieved around the bolt holes to allow twisting movements of gear casing relative to the base.

The supporting legs connecting the flange 20 with the three support pads 21, 22, 23 comprise two flat plate members 24, 25 extending out from the casing, which are rigid in a transverse and in a vertical direction, but which will bend under longitudinal force, i.e., they are flexible in an axial direction.

The control console 4 consolidates all of the control functions in a rigid casing 26. The console 4 contains the speed governing system, speed changer, oil pump, regulating valves, and various supervisory instruments, none of which are material to the present invention except in so far as the fact that the console contains rotating equipment which must be coupled to a rotating shaft of the turbine-generator set. The governor shaft of control console 4 is connected to the shaft of the low-speed rotor by a flexible coupling, as will be explained, and, through the speed governing system, serves to operate the valves by means of a linkage 27.

Referring now to FIG. 2 of the drawing, which is a plan view in section, it will be observed that generator 1 and reduction gear 2 are coupled by means of a flexible coupling 30, which is torsionally rigid, and which permits a limited amount of axial movement between shafts. Coupling 30 includes a splined hub 31 keyed to the generator shaft, a splined hub 32 keyed to the low speed gear shaft, and a separable internally splined sleeve 33 for transmitting torque. A stop 30a limits movement of the shaft ends toward one another. Sleeve 33 is made in two halves connected by bolts 34. By separating the halves, the generator and gear shafts can be aligned externally by taking face and rim readings on hubs 31, 32.

The reduction gear 2 and turbine 3 are connected by a flexible thrust-transmitting coupling 35. Details of a suitable thrust-transmitting coupling, which is both laterally and torsionally flexible, but of the torque-limiting type, may be had by reference to U.S. Patent 3,141,313 issued to S. P. Brickett and H. N. Hoffman, which is assigned to the present assignee and incorporated herein by reference. Briefly, coupling 35 comprises a slender, laterally and torsionally flexible thrust-transmitting shaft 36 which has a flange 37 bolted to a flange 38 on the turbine shaft. The other end of the shaft 36 is arranged with a conventional thrust bearing 39. Overload torque is taken by means of hollow pinion shaft 40. Pinion shaft 40 meshes with tapered face coupling teeth 41 on flange 37 at one end and it is splined to the shaft 36 on the other end (details not shown) in the vicinity of the thrust bearing 39.

In the embodiment shown, the turbine itself has no thrust bearing, but thrust of both the turbine shaft and the high speed pinion shaft are carried by thrust bearing 39. Therefore, the high speed shaft assembly is located from this single thrust bearing.

The proper turbine-to-gear casing axial spacing is provided by means of longitudinal laterally flexible thrust bolts, such as shown at 42. It is important to note that bolts 42 and the flexible coupling 35 are disposed in a common housing 50. Housing 50 contains oil vapor and facilitates transfer of heat between bolts 42 and the parts of coupling 35 so that they are substantially at the same temperature and react in the same manner to thermal transients.

Thrust communicated to the reduction gear casing from the turbine casing (by means of bolts 42) is absorbed by the axially flexible plate members 24, 25 supporting the gear casing.

The control console 4 which includes the speed control mechanism, valve control mechanism, and oil pump (not shown) is connected to the low speed gear shaft by means of a third flexible coupling designated generally as 43. This flexible coupling is very simple, comprising a square shaft 44 passing through a square hole 45 in a disc-shaped insert 46 bolted to the gear shaft and a square hole in a rotating worm (not shown) inside the console. The fit between the square shaft 44 and the mating square holes in the gear shaft and the "worm" allows the control console and the reduction gear to move axially with respect to one another, as well as permitting slight lateral misalignment.

It remains to note that the low speed gear shaft also includes thrust bearings 47 which carry thrust of the low speed gear, as well as any slight thrust loads on the generator shaft.

The operation of the invention will be apparent from the following description: The portions of the casings of generator 1, reduction gear 2, turbine 3, control console 4 supporting the bearings are designed to be individually rigid and maintain internal alignment of casings with respect to their rotors. It is unnecessary to open the casings to perform alignment between units, because all units are connected by flexible couplings. In every case there are means to check initial alignment by making external measurements. This is done by checking concentricity and spacing between either the rotating or suitable stationary parts of the coupled units which are closely adjacent one another.

During installation and during actual operating conditions, lateral, torsional and longitudinal deflecting forces will be communicated to the frame of the supporting base 5. Since the reduction gear and turbine are mounted on three point supports, these deflections will not be communicated in such a way as to cause internal distortions in the casings themselves. Although the generator is not mounted on a three point support, its construction is rigid enough to resist these deflections.

The rigid pedestal 15 supporting the high pressure end of the turbine is the anchor or reference point for the turbine and gear units. As for the turbine casing itself, the remaining two pedestals 16, 17 flex axially to accommodate thermal expansion of the turbine casing.

As for the reduction gear casing, thrust rods 42 maintain proper axial spacing from the turbine casing from a location near the rigid pedestal 15. The axially flexible support plates 24, 25 in the gear casing mounting will bend to allow the thrust rods to do this job.

The thrust rods 42 will maintain fixed spacing under conditions of base bending which would otherwise make the distance between the casings change. Secondly the thrust rods actually change the spacing as the turbine temperature rises, but because they are subjected to the same temperature as the flexible coupling members, the proper axial spacing is maintained for both stationary and rotating members despite temperature changes.

The gear casing (which is located with reference to the turbine rigid pedestal 15) becomes the reference location for the high speed shaft assembly by reason of the coaction of the thrust bearing 39 and the thrust-transmitting coupling 35. Thrust bearing 39 positions the high speed gear shaft and it, in turn, positions the turbine shaft through coupling 35.

Thus there is a chain of reference points, each located with respect to the previous reference point, i.e., from the high pressure end of the turbine casing, to the reduction gear casing, to the thrust bearing, to the high speed gear shaft, and finally to the turbine shaft with attached turbine blades. Therefore the axial clearances between high pressure turbine casing parts and turbine blades are maintained by a thrust bearing some distance away in spite of changes in temperature and support structure.

The flexing of gear support plates 24, 25 due to the interaction between the reduction gear and the turbine will not result in substantial thrust forces between the generator and gear shafts, since the generator shaft has no thrust bearing of its own. Coupling 30 will accept lateral misalignments, is torsionally rigid, and will transmit light thrust loads.

Movements of the reduction gear casing do not affect the control console 4 for similar reasons, because of the axially slidable flexible coupling 43. Therefore, the control console 4, which includes speed sensitive elements as well as piping and other critical elements is isolated from the forces acting on the large rotating members.

While there has been described herein what is considered to be the preferred embodiment of the invention, other modifications will become apparent to those skilled in the art. It is desired to cover in the appended claims all such modifications as fall within the true spirit and scope of the invention.

What I claim as new and desire to secure by Letters Patent of the United States is:

1. In a turbine-generator set of the type having a turbine with a casing and a rotor shaft, a reduction gear with a casing and high speed and low speed shafts, and a generator with a casing and rotor shaft, all mounted on a single base subject to deflection, the improvement comprising:

first means supporting said reduction gear casing on the base and constructed to be substantially flexible in an axial direction but substantially rigid in other directions, second means supporting said turbine on the base and including an axially rigid pedestal supporting the end of the turbine nearest the reduction gear, laterally flexible spacer means connecting the gear casing and the turbine casing adjacent said rigid support pedestal so as to maintain the axial position of the gear casing relative to the turbine casing by causing the first support means to flex axially, a thrust bearing for said high speed gear shaft constructed to fix the high speed gear shaft axially relative to the gear casing, and a first thrust-transmitting flexible coupling connecting the turbine shaft with the high speed gear shaft so as to locate the turbine shaft axially relative to the high speed gear shaft.

2. The combination according to claim 1, including means facilitating transfer of heat between said first flexible coupling and said spacer means, whereby temperature changes affect both in substantially the same manner so that axial clearances in the turbine are maintained during transient thermal conditions.

3. The combination according to claim 1, including a second flexible coupling connecting the low speed gear shaft with the generator shaft, said second coupling being constructed to permit limited axial movement and to transmit only light axial thrust.

4. The combination according to claim 1, wherein said first support means is attached to the base at three points, so that twisting movements imparted to the base are not communicated so as to distort the gear casing itself.

5. The combination according to claim 1 whereas said second support means includes two axially flexible pedestals on the turbine end opposite said axially rigid pedestal, whereby the turbine can expand thermally in an axial direction from said rigid pedestal.

6. The combination according to claim 1, wherein a separate control console having rotating speed responsive means therein for controlling the turbine is mounted on said base, said speed responsive means having a shaft coupled to one of said aforementioned shafts by a third flexible coupling.

7. The combination according to claim 1 including a second flexible coupling connecting said generator and one end of the low speed gear shaft, a control console casing with a shaft, a third flexible coupling connecting said control console shaft and the other end of the low speed gear shaft, said casings all being individually mounted on said base, whereby alignment can be made for casings and shafts externally by adjusting said casings, the adjustments being permitted by the flexible couplings.

8. In combination,
   a turbine-generator base structure,
   a turbine casing disposed at one end of said base structure,
   a mounting for said turbine casing comprising a first rigid pedestal and second and third axially flexible pedestals at the other end thereof,
   a reduction gear having a casing and a high speed shaft aligned with said turbine shaft and also having a low speed shaft,
   an axially flexible mounting for said reduction gear casing connected to the base structure at three points and constructed to allow the casing to move in an axial direction,
   a generator disposed at the other end of said base structure and having a shaft aligned with said low speed gear shaft,
   a first flexible thrust-transmitting coupling connecting turbine shaft and high speed gear shaft,
   a thrust bearing disposed in said reduction gear casing and locating the coupled high speed gear shaft and turbine shaft,
   laterally flexible means spacing said turbine casing and gear casing near the first turbine pedestal, whereby temperature changes and movements of the base will cause the reduction gear mounting to flex axially, and
   a second flexible coupling connecting the low speed gear shaft with the generator shaft.

References Cited by the Applicant
UNITED STATES PATENTS

| | | |
|---|---|---|
| 2,412,848 | 12/46 | Warren. |
| 2,531,178 | 11/50 | Van Nest. |
| 2,821,094 | 1/58 | Ericson. |
| 2,867,999 | 1/59 | Hoffman et al. |

JULIUS E. WEST, *Primary Examiner.*